Patented Mar. 28, 1933

1,903,021

UNITED STATES PATENT OFFICE

FRITHJOF ZWILGMEYER, OF HAMBURG, NEW YORK, ASSIGNOR TO NATIONAL ANILINE AND CHEMICAL COMPANY, INC., OF NEW YORK, N. Y., A CORPORATION OF NEW YORK

TRISAZO DYE

No Drawing. Application filed April 18, 1930. Serial No. 445,527.

This invention relates to the manufacture and production of new trisazo dyestuffs which are of value for dyeing cotton and other fibres. Materials dyed or printed with the new dyestuffs also form a part of the present invention.

The new trisazo dyestuffs of the present invention can be prepared by coupling one molecular proportion of tetrazotized benzidine with one molecular proportion of 1.8 aminonaphthol-3.6-disulfonic acid (H-acid) in acid solution to produce a diazo-monazo body (first intermediate), then coupling into this diazo-monazo body in alkaline solution one molecular proportion of diazotized 1-naphthylamine-6 (or 7)-sulfonic acid (Cleve's acid) to produce a diazo-disazo body (second intermediate), and finally coupling the diazo-disazo body in alkaline solution with one molecular proportion of 2.8-aminonaphthol-6-sulfonic acid.

The new dyestuffs in the free state correspond with the following probable formula:

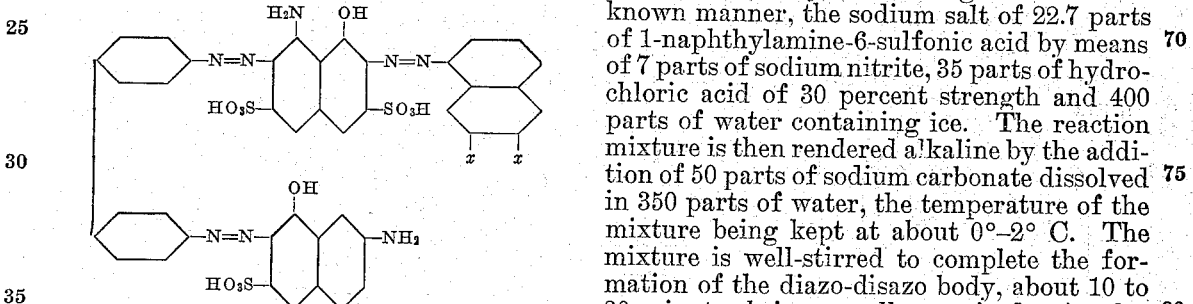

wherein one $x$ is a hydrogen atom and the other $x$ is a sulfo-group.

The new dyestuffs in the dry and pulverized state and in the shape of their sodium salts are black powders soluble in water giving a blue-black solution, soluble in concentrated sulfuric acid giving a blue solution, and dyeing cotton from a neutral or slightly alkaline bath gray to blue-black shades of excellent fastness to light and to washing.

Upon treatment with an alkaline solution of sodium hydrosulfite, the color discharges to a white.

The following specific example, in which the parts are by weight, will further illustrate the invention:

*Example.*—19 parts of benzidine are tetrazotized in the usual manner by means of 14 parts of sodium nitrite and 53 parts of hydrochloric acid of 30 percent strength in the presence of 150 parts of water containing 50 parts of ice. Into this solution there is slowly added, with stirring, 34 parts of 1.8-aminonaphthol-3.6-disulfonic acid previously dissolved in 350 parts of water and 5.5 parts of sodium carbonate. The mixture is stirred until the coupling is complete, the intermediate diazo-monazo product separating in the form of a black precipitate. To the solution containing the diazo-monazo body in suspension there is added, the temperature of the mixture being maintained at about 0°–2° C., a diazo solution obtained by diazotizing in the well-known manner, the sodium salt of 22.7 parts of 1-naphthylamine-6-sulfonic acid by means of 7 parts of sodium nitrite, 35 parts of hydrochloric acid of 30 percent strength and 400 parts of water containing ice. The reaction mixture is then rendered alkaline by the addition of 50 parts of sodium carbonate dissolved in 350 parts of water, the temperature of the mixture being kept at about 0°–2° C. The mixture is well-stirred to complete the formation of the diazo-disazo body, about 10 to 30 minutes being usually required. A solution of 24 parts of 2.8-aminonaphthol-6-sulfonic acid dissolved in 150 parts of water and 11 parts of sodium carbonate is then added to the mixture containing the diazo-disazo body, and the whole is stirred until the coupling is complete in the formation of the trisazo dyestuff. The mixture is then heated to about 80°–90° C., and the dyestuff is precipitated by the addition of common salt. It is filtered off, pressed and dried. The resulting product is the sodium salt of the trisazo dyestuff having the probable formula:

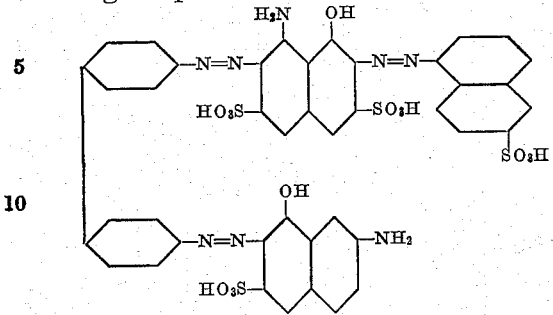

In the above example, 1-naphthylamine-6-sulfonic acid or 1-naphthylamine-7-sulfonic acid or a mixture of these acids may be used.

It will be understood that the conditions, such as temperature, concentrations, proportions, etc., employed in the preparation of the new dyestuffs may be varied without departing from the scope of the invention.

I claim:

1. A trisazo dye which in the free state corresponds with the following probable formula:

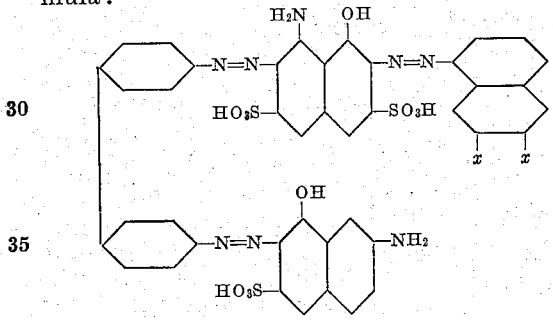

wherein one $x$ is a hydrogen atom and the other $x$ is a sulfo-group, said dyestuff in the dried and pulverized state in the form of its sodium salt being a black powder soluble in water, and soluble in concentrated sulfuric acid to give a blue solution; and dyeing cotton gray to blue-black shades.

2. A trisazo dye which in the free state corresponds with the following probable formula:

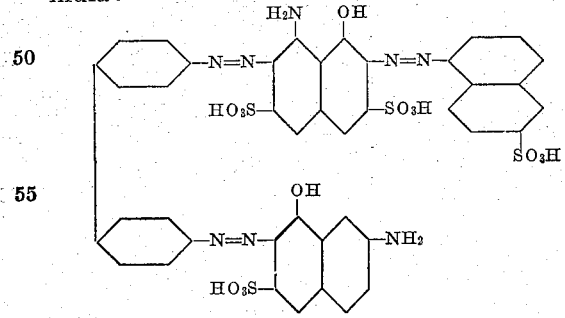

said dye in the form of its sodium salt being a black powder and dyeing cotton gray to blue-black shades.

In witness whereof I have hereunto set my hand.

FRITHJOF ZWILGMEYER.